No. 664,343. Patented Dec. 18, 1900.
W. B. WHEELER.
COIN OPERATED OPERA GLASS.
(Application filed Apr. 13, 1900.)

(No Model.)

Witnesses
E. W. Hart
Elmer Leavy

Inventor
Webster B. Wheeler
by E. E. Masson,
Attorney.

UNITED STATES PATENT OFFICE.

WEBSTER B. WHEELER, OF WASHINGTON, DISTRICT OF COLUMBIA.

COIN-OPERATED OPERA-GLASS.

SPECIFICATION forming part of Letters Patent No. 664,343, dated December 18, 1900.

Application filed April 13, 1900. Serial No. 12,737. (No model.)

*To all whom it may concern:*

Be it known that I, WEBSTER B. WHEELER, a citizen of the United States, residing at Washington, in the District of Columbia, have invented certain new and useful Improvements in Coin-Operated Electrical Apparatus, of which the following is a specification, reference being had therein to the accompanying drawings.

This invention relates to improvements in apparatus used with loan-receptacles and in which the mechanism is actuated by the insertion into the apparatus of a coin, and more particularly to that class for permitting the use of a lens-carrying tube or device, as a spyglass, opera-glass, stereoscope, microscope, stereopticon, and other similar devices, in which a sight through the lens-tube can be obtained and controlled for any desired length of time—as, for example, from five to ten minutes—the sight-controller consisting of hinged shutters, one or more of which is operated by a suitable source of electrical energy through the medium of a clockwork.

My present invention has for one object to simplify the construction of the sight-controller by forming the same as a hinged shutter closed by gravity in one direction and providing an electromagnet to hold the shutter open when a proper coin has been deposited. Another object is to provide suitable coin-operated mechanism for controlling the electrical circuit established between the source of energy and the glasses.

With these ends in view my invention consists in the peculiar details of construction and in the arrangement and combination of and parts, as hereinafter more particularly described.

In order that those skilled in the art may know how to make my improved attachment and that those for whom it is especially designed may understand how to use the same, I will proceed to describe the construction and mode of using my improved sight-controller, referring by letters and numerals of reference to the accompanying drawings, in which—

Figure 1:
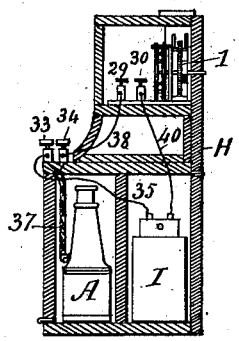
Figure 2:
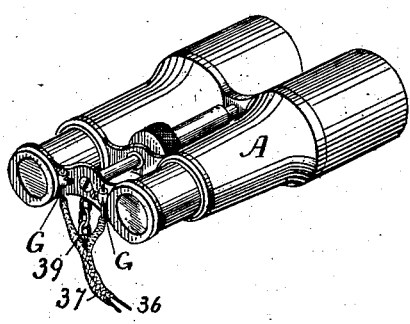
Figure 3:
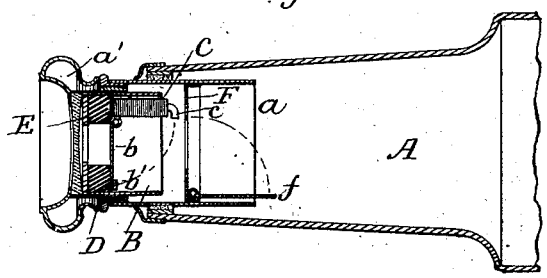
Figure 4:
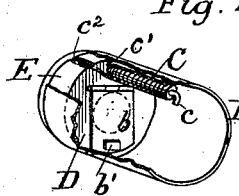
Figure 5:
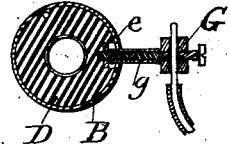
Figure 6:
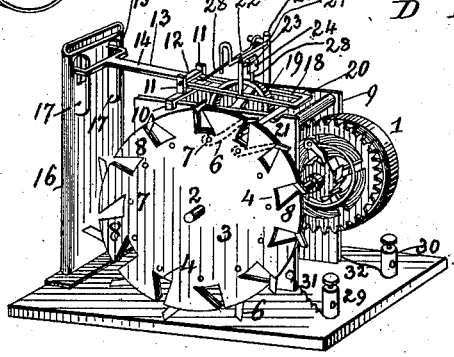

Figure 1 is a central vertical section through the casing or receptacle containing the glasses, battery, and operating mechanism, showing the general arrangement of the same. Fig. 2 is a perspective view of a pair of binoculars provided with my improved shutter, showing the electrical connections. Fig. 3 is a central longitudinal section through the rear end of one of the glasses, showing the relative positions of the shutter and coacting elements. Fig. 4 is a sectional detail of the socket or shutter-carrying tube with parts broken away to show the electrical connections. Fig. 5 is a transverse section through the non-conducting base, showing the connection between the disk and binding-post. Fig. 6 is a perspective view, on a larger scale, of the coin-operated mechanism for controlling the electrical circuit, showing the lower portion of the coin-chute, clockwork, and binding-posts for battery and glass circuits.

In Fig. 2 of the drawings is represented a pair of field-glasses or opera-glasses of any desired pattern or size, the component parts of which consist of an outer barrel A and an inner lens-carrying tube $a$, which is adapted to slide in and out of the tube A, as usual, in focusing the lenses. To prevent a person from fraudulently obtaining a clear sight through the glasses, each lens-carrying tube is provided with a hinged shutter $b$, preferably of sheet metal, as iron. Said shutter is shown in section in Fig. 3 and in elevation in Fig. 4 as consisting of an oblong strip or flap $b$, mounted in a socket or short tube B, adapted to be sleeved into the threaded cap or head $a'$ of the lens-carrying tube $a$. A magnet C is properly secured to a block D of non-conducting material, which is suitably secured in and constitutes the base of the socket, and said magnet has its pole $c$ bent laterally in a position to attract the soft-iron projection $b'$ of the shutter when energized. I preferably form the field of said magnet of six or more layers of very fine insulated wire, the terminals of which are connected as shown in Fig. 4, one, $c'$, with the socket B and the other, $c^2$, led down through an incision in the non-conducting base D to an apertured metal disk E, which is secured to base D by screws or otherwise. The non-conducting base D is also centrally apertured for the passage of light. The metal disk E is provided with a bent lug or tongue $e$, extending upwardly through a recess in the non-conducting base D, and said tongue has a threaded aperture to receive the insulated screw $g$ of the binding-post G. The only mutilation of the lens-tube is an orifice in the inwardly-bent rim of its cap $a'$ to permit the passage of the screw $g$, which latter passes through said orifice and through a corresponding one in socket B, from both of which elements it is insulated and engages in said tongue.

Referring now to Fig. 6, the parts will readily be recognized as consisting of a suitable clockwork and coin-operated means for actuating the same. The clock mechanism proper is of usual form, requiring no description here. The same may be designated by 1, and it will be seen that the minute-hand shaft 2 carries a notched disk 3, the notches 4 extending peripherally thereof and being preferably angular in form. The spaces between the notches may be made to indicate any period of time. In the present instance I have shown them as being twelve in number and located equidistant from one another, the space between any two representing five minutes and the entire circumference one hour. The disk 3 is further provided with dogs 6, which are pivoted at 7 in recesses formed in the extensions 8, and these dogs normally bear by gravity upon the next adjacent extension. The frame 9 of the clock is served at one end with a support 10, carrying uprights 11 11, perforated to provide a bearing for the axis 12 of a balanced lever or trip 13. The latter has its rear arm 14 forked, as at 15, and extending within elongated slots 17 17 of the coin-chute 16. The forward end of the lever consists of a rectangular member 18, the lateral members of which are located either side of the balance-wheel 19 of the clock. Said forward end carries a laterally-projecting weighted pin 20, adapted to normally engage one of the notches 4 of disk 3, the frame 9 of the clock being notched at 21 to facilitate this purpose. One of the lateral members of the element 18 carries substantially at its middle a rod 22, bearing a pin 23, upon which is hinged the swinging blade or paddle 24, the function of which is to normally engage the pin 25 upon the periphery of the balance-wheel 19 to prevent movement of the latter. A standard 26 has a horizontally-extending arm 27, provided with an eye in which is guided a contact-spring 28, adapted to make contact with the balance-lever 13 when the same has been tripped by the deposit of a proper coin. It will also be seen that provision is made for two binding-posts 29 30, which are electrically connected with the clock-frame 9 and standard 26, respectively, by wires 31 32. The binding-post 29 is in circuit with the battery I or other source of current and binding-post 30 with the sight-controller.

For the purpose of rendering the clock mechanism removable from the receptacle containing the apparatus I provide two binding-posts 33 34, one of which connects directly with the battery I by wire 35, while the other connects with binding-post 29 by wire 38. The binding-posts G of the glasses are electrically connected with said binding-posts 33 34 by flexible wires 36 36, inclosed in a cable 37, which is strengthened by chain 39, connected in any suitable manner to the glasses.

When a proper coin is deposited in the chute 16, the balance-lever 13 is tripped, releasing the balance-wheel and causing the weighted pin 25 to release the disk 3, bringing said lever into engagement with contact-spring 28. The current emanating from its source I now passes through wire 40 to binding-post 30, to standard 26, to contact-spring 28, balance-lever 13, frame 9, binding-post 29 to binding-post 34, by wire 38 to binding-post G, through the screw $g$ to the electromagnet C via the tongue $e$ of the disk E and wire $c^2$, through the field of the magnet and by wire $c'$ to socket B, and thence through the apparatus to the socket in the other glass to the battery.

To prevent any successful attempt to use the glasses without first depositing a coin in the apparatus by turning the glasses upside down and causing the shutters $b$ to drop back by gravity, I provide an apertured partition F, to which is hinged the shutter $f$, inversely arranged to shutter $b$. Any number of shutters $f$ may be used at different angles within the barrel A, if desired.

The apparatus used to contain the pair of glasses consists of a box H, divided, preferably, into four compartments, the lower section having two of them, the front one of which receives the glasses (shown at A) and the rear one containing one or more batteries I, Fig. 1, to supply the necessary current to operate both the sight-controller and the coin-operating and timing parts of the apparatus, as above described.

The improvement is susceptible of various changes in the form, proportion, and minor details of construction without departing from the principle or sacrificing any of the advantages thereof, the form herein shown and described being but one of the many adaptations the invention is capable of.

Having thus described my invention, I claim—

1. In combination with a coin-operated electrical apparatus, a sight-tube, an electromagnet located therein, and a hinged shutter normally closing said tube and adapted to be held open by the pole of said magnet when the latter is energized.

2. In combination with a coin-operated electrical apparatus, a sight-tube, an electromagnet mounted therein, a hinged shutter normally closing said tube and adapted to be held open by the pole of said magnet when the latter is energized, and another hinged shutter operating by gravity to close said tube.

3. In a loan-receptacle and apparatus, a sight-tube, an electromagnet mounted therein, a hinged shutter normally closing said tube and adapted to be held open by the pole of said magnet when the latter is energized, and another hinged shutter operating by gravity to close said tube, in combination with a coin-operated timing device for the shutter.

4. In a loan-receptacle and apparatus, a sight-tube, an electromagnet mounted therein, a hinged shutter normally closing said tube and adapted to be held open by the pole of said magnet when the latter is energized, an electrical circuit and a source of electrical energy, and another hinged shutter operating by gravity to close said tube, in combination with a timing device for the shutter, including a clockwork located in the circuit.

5. The combination of a sight-tube, an electromagnet mounted therein, a hinged shutter normally closing said tube and adapted to be held open by the pole of said magnet when the latter is energized, an electrical circuit including battery or batteries, another hinged shutter operating by gravity to close said tube, and a timing device for the electrically-controlled shutter, comprising coin-actuated clock mechanism in the circuit with the battery, a notched disk upon the minute-hand shaft, a coin-chute, a balance-lever normally engaging the balance-wheel having an arm extending within the coin-chute, another arm on said lever normally engaging the notched disk, means for causing said lever to "make" the circuit when a coin is deposited, and electrical connections from the clock mechanism to the sight-tube.

In testimony whereof I affix my signature in presence of two witnesses.

WEBSTER B. WHEELER.

Witnesses:
 E. E. MASSON,
 E. W. HART.